Figure 1:
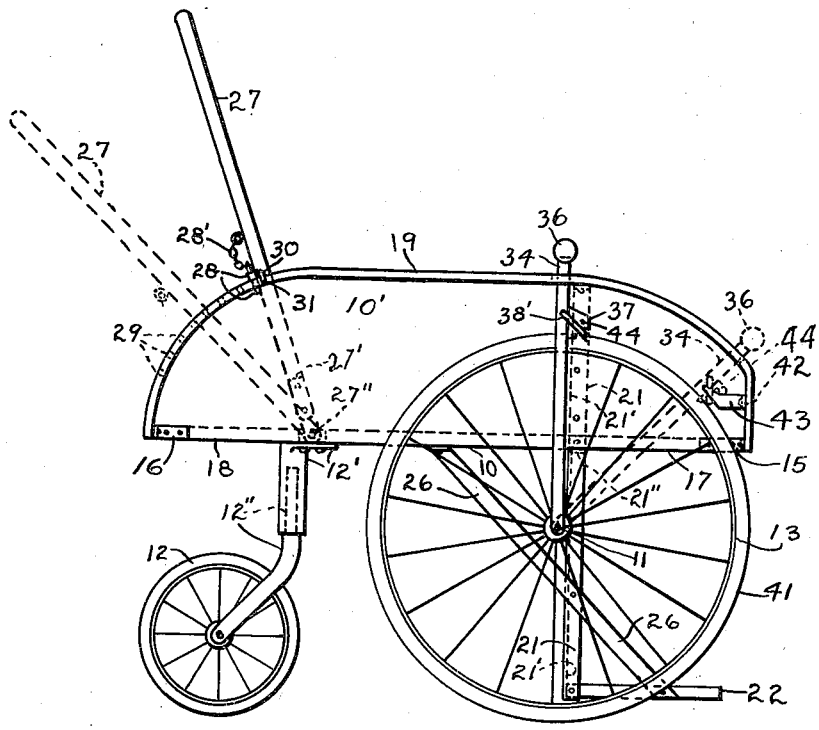

Sept. 20, 1938.  D. HENDERSON  2,130,426
WHEEL CHAIR DRIVE
Filed Jan. 22, 1937  2 Sheets-Sheet 1

INVENTOR
D. HENDERSON
BY G. Ward Kemp
ATTORNEY

Sept. 20, 1938.  D. HENDERSON  2,130,426
WHEEL CHAIR DRIVE
Filed Jan. 22, 1937  2 Sheets-Sheet 2

INVENTOR
D. HENDERSON
BY G. Ward Kemp
ATTORNEY

Patented Sept. 20, 1938

2,130,426

UNITED STATES PATENT OFFICE 2,130,426

WHEEL CHAIR DRIVE

Donald Henderson, Bremerton, Wash.

Application January 22, 1937, Serial No. 121,774

4 Claims. (Cl. 280—244)

This invention relates to wheel chairs, and particularly to driving mechanism therefor to be operated by occupants of such chairs.

In the use of wheel chairs, particularly of the type used for invalids, it has been the custom for the occupants thereof to propel the same, by grasping and turning the rims of the supporting, or driving wheels, or by turning auxiliary smaller wheels or rings attached to the outer sides of such driving wheels. Such methods have been unsatisfactory for many reasons, including the following:

Such driving wheels frequently pass over unclean surfaces, and the hands of the operators become contaminated by substances accumulated on said rims. In turning such rims or wheels by the hands, the operators ordinarily must reach down along the outsides of the wheels and grasp the rims or wheels and turn the same forward. The power of the arms and hands in such use cannot be uniformly applied, as the different positions of the hands as the wheels revolve, reduces the ability of the arms to turn the wheels, as is easily understood. When the arms of the operator are extended outside over either of such wheels, and particularly over the auxiliary wheel, they frequently come into collision with furniture and other objects along the line of travel, and especially with the casings of doorways through which the chairs may be moved.

It is therefore an object of this invention, to provide means whereby an occupant of a wheel chair may operate and propel the same, without soiling of the hands, and with a uniform ease and power of the arms, and without endangering the hands or arms by collision with outside objects, along the line of travel.

Another object is to provide a ground travelling chair with side wheels for supporting and propelling the same, with reciprocating means for contacting with the periphery of such wheels for turning the same, to move such chair forward and back in the directions desired.

Further and particular objects are, to provide such a wheel chair, with fixed side arms, guide slots through the same, power levers projected upward through such slots, to be pivotally connected at their lower ends, and with handles affixed to the top ends thereof for moving the same. Such levers are to be provided with adjustable dogs pivotally mounted over the rims of the wheels to be turned, said dogs adapted to bind against such rims and turn such wheels when the levers are pushed forward, and to ride freely along such rims when the levers are drawn backward. The said dogs are further adapted to be reversed in position for turning such wheels backward, as may be desired. The said arms are to be provided with fingers for raising such dogs from contact with such rims at the forward line of travel of said levers.

Figure 2:
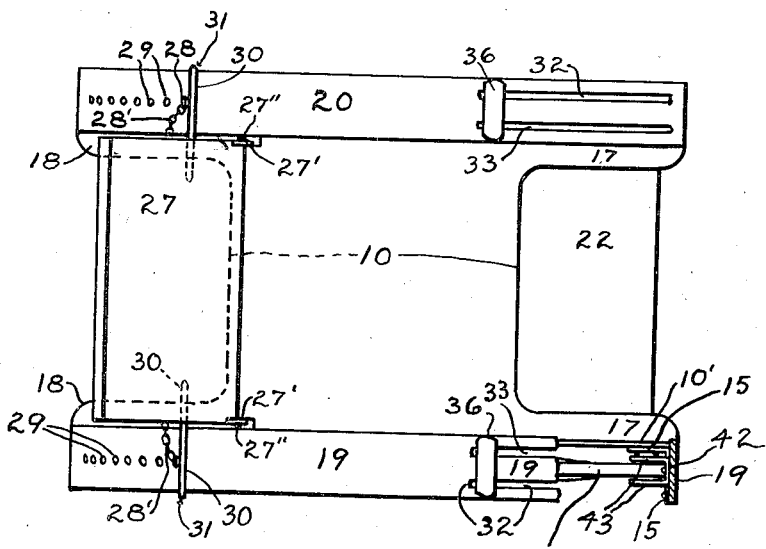
Figure 3:
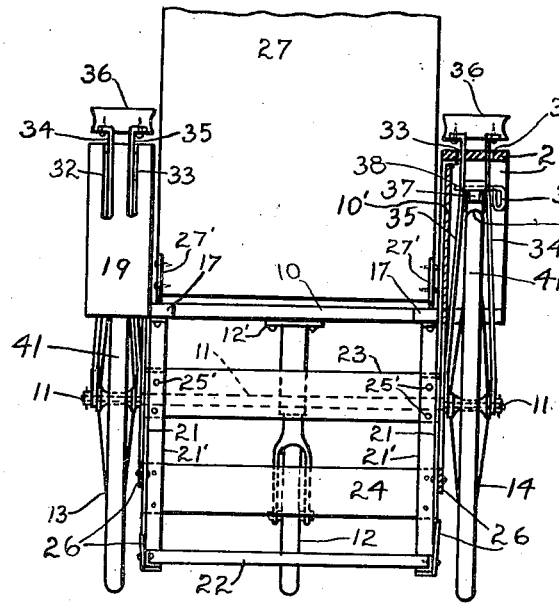
Figure 7:
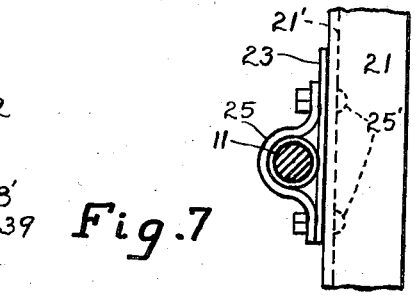
Figure 6:
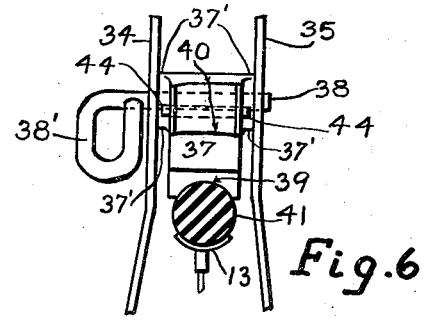
Figure 4:
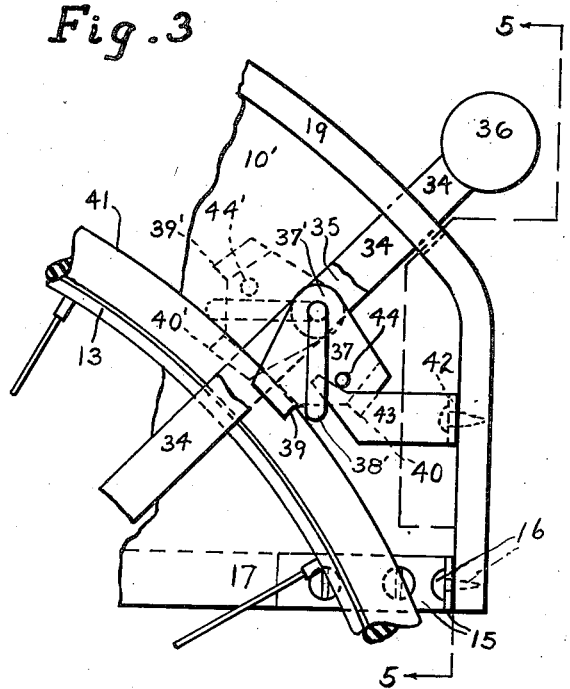
Figure 5:
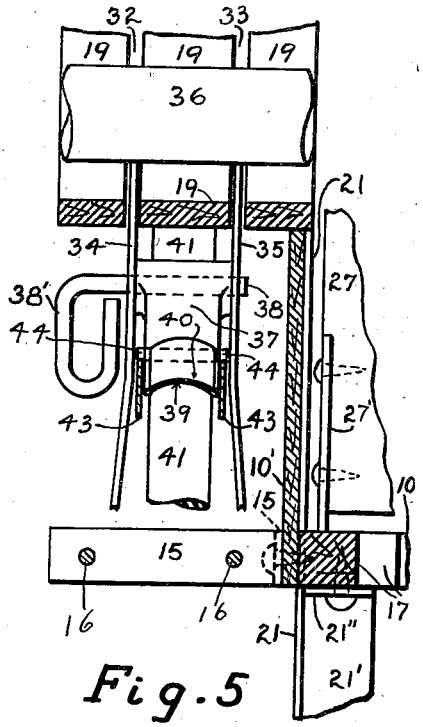

With these and other objects, to be hereinafter shown, I have illustratively exemplified my invention by the accompanying drawings, of which:

Figure 1 represents a side elevation of the completed chair, with the driving handle, and a seat back, in alternate positions, Figure 2 represents a plan view of the chair, with a portion of the front of one arm broken away, Figure 3 represents a front elevation of the chair with the front end of one arm broken away, Figure 4 shows an enlarged fragmentary side elevation of the forward end of the chair, with parts broken away, Figure 5 shows an enlarged fragmentary end view of one side of the chair with parts broken away, taken on angular line 5—5 of Figure 4, Figure 6 shows a fragmentary detail front view of the dog and levers, Figure 7 shows a detail fragmentary view of the end of one axle as attached to a side post and cross brace.

Like numerals on the different figures represent like parts.

Numeral 10 represents a chair seat, with panels 10' extended upward from each side thereof, 11 represents a supporting axle spaced below the seat, and 13 and 14 represent driving wheels rotatably mounted on the opposite ends of the axle. The rear portion of the chair is supported by a central wheel 12, connected to the seat by a socket bracket 12' and spindle 12", rotatably disposed in the socket.

The outer edges of the seat are projected forward and backward for frames, as 17 and 18. Attached near the outer ends of these frames, are angle plates 15, with one of the ends thereof extended outward at right angles, to which are attached respectively as by screws 16, the front and rear lower ends of curved arm rests, or rails 19 and 20. The inner edges of such rails are preferably attached to the tops of such panels.

Side posts, preferably of angle iron with webs 21 and 21' are attached to and extended downward from said seat to a point near the base of wheels 13 and 14, and terminate in connection with a forwardly projecting foot rest 22, extending between said oppositely disposed posts. Between such posts and below the seat are also preferably connected cross braces 23 and 24.

The axle 11 is attached to said posts by any means as by clamps 25 and bolts 25′ passed through one of said braces and through the web 21′. Said last described webs 21′ are also projected above said seat and attached to said arms respectively, and for additional rigidity, braces 26 are disposed obliquely down on each side and attached to the rear portion of said seat at one end and midway to said posts, and at the lower end attached to such foot rests.

At the rear end of said seat, is a suitable back member 27, connected by pivot pins 27″ and reinforcing plates 27′, to provide for adjustable angles for said back. Latch pegs 28, and holes 29 therefor through said arm rails, are provided for retaining such back in the positions desired. From the edges of said back are projected rods 30, with the outer ends 31 thereof turned downward slidably over such arms, for contact with such pegs, and to restrain said arms from spreading outward.

Through forward portions of said arms are provided pairs of guide slots 32 and 33, and slidably positioned through such slots are pairs of driving levers, 34 and 35. These levers are connected at their tops by cross handles 36, for manual operation, and are projected downward on each side of said wheels 13 and 14 respectively, and the lower ends thereof rotatably connected over the axle 11.

Between said pairs of levers, and over said driving wheels, are rotatably mounted driving pawls or dogs (generally indicated as 37) on pivot pins 38. Such pins are extended through the base, or heels 37′ of said dogs, and through each of said respective pairs of levers. The outer ends of such pivot pins are preferably extended outside of one of said levers and turned to provide an ear 38′, for manual rocking of the dog. The opposite ends or heads of such dogs, are provided with oppositely disposed lips, as 39 and 40, which are curved respectively to conform with the periphery of the tires 41, of the driving wheels, and normally ride respectively upon said tires. Said tires are preferably formed of soft rubber, to permit said lips to be depressed therein, for driving when said levers are reciprocated by the operator. In order to automatically elevate such lips 39 from contact with said tires, and to retain such lips above said tires for any period or reason, a bracket plate 42, with spaced fingers 43, is attached to the forward portion of each of said arms adjacent the front end of said slots. Said fingers are projected backward over the edges of said tires, and the head of said dog is provided with a cross pin with lugs 44, on each side thereof, which are adapted to ride over and upon said fingers when the dog has reached a forward position adjacent the front ends of said slots. The lips 39 will be thereby raised above said tires, and so remain until said levers are moved backward. Similar fingers may be provided for raising the lips 40 from the tires, on backward strokes, but it is not found generally necessary to so do.

The length of said slots determines the extreme limits of the movement of said levers, but the operator may at any time shorten the strokes of said levers, and may also commence a stroke at any point along the line of travel of such levers.

When the operator desires to move said chair forward, he presses said handles forward, and thereby the lips 39 are depressed into or against said tires, and the driving wheels turned and the chair carried forward. In event the operator desires to move backward, such dogs are rocked backward, and the lips 40 then contact with and turn said wheels backward. In order to turn sharply, only one dog may be reversed, and the handles separately operated in opposite directions. In event the operator should desire, or be obliged to operate the chair with one hand only, then the two handles may be connected across in front of the operator temporarily as by a cane or other means, and the both handles may be thereby operated as one. When said dogs are elevated by said fingers, the handles will remain in forward positions, and the chair may be moved about, without the movement of said levers.

In travelling down a grade, the dogs may be depressed against the free turning wheels, and thereby retard the wheels as a brake.

While I have described specific forms of construction, I do not limit my invention thereto, but desire to protect all other equivalent forms, that may lie within the scope of my claims.

Should the operator desire to hold the chair stationary in any place, as on an inclined surface, he may do so, by moving the propelling arms to the extreme line of travel to which the chair would travel by gravity, and then by reversing the driving dogs to positions against the gravity line of travel, all movement of the wheels will be checked by the pressure of said dogs upon the peripheries of the wheels.

Having described my invention I claim as new:

1. A device for operating a ground travelling wheel for an invalid chair, comprising an actuating lever pivotally connected at one end thereof to an axle, the other end of said lever projected upward above the top of said wheel, an actuating dog pivotally connected to the upper portion of said lever and spanning the rim of said wheel, one end of said dog bifurcated and outward lips on the said dual end, means for shifting the position of said lips for alternate contact with the rim of said wheel, for turning said wheel in the forward and in the opposite direction, said dog further adapted to be depressed into the rim of said wheel for restraining the turning thereof for braking the same, lugs projected outward from the sides of said lips, and fingers spanning the line of travel of said dog in fixed relation from said wheel and adapted to automatically lift said dog from contact with said wheel at a predetermined point for releasing said wheel and to facilitate the free movement thereof.

2. A reciprocating device for operating a soft rimmed ground travelling wheel for an invalid chair, comprising an actuating hand lever pivotally connected at one end thereof with an axle and extended therefrom upward above the said rim, an actuating pawl pivotally connected at one end thereof to the outer end of said lever and spanning said rim, oppositely disposed lips on the other end of said pawl adapted to be depressed into said rim of said wheel for turning the same in either direction, means for manually reversing the position of said lips for such opposite direction turning of said wheel, spaced fingers fixed in the line of travel of said pawl and wheel and spanning said rim, and lugs extended outward from said lips and adapted to ride up on said fingers and release said lips from said rim for freeing the said wheel therefrom at a predetermined point.

3. Means for propelling a ground travelling wheel for use on an invalid chair, comprising, a lever projected from an axle for said wheel adapted to be manually operated by the user of such chair, an actuating pawl spanning the rim of said wheel and pivotally connected at one end thereof to the extended end of said lever, the other end of said pawl extended outward with two points on opposite sides of said lever respectively adapted to respectively bind upon and beneath the surface of the rim of said wheel when said lever is moved to and fro, means for reversing the position of said points for turning said wheel in the direction desired and for braking the movement of said wheel as desired, lugs extended outward on each side of said points, and means mounted in the line of travel thereof adapted to lift said points automatically from contact with said wheel to facilitate the free movement thereof.

4. A device for operating a ground travelling wheel for use on an invalid chair and the like, comprising a wheel mounted on an axle, an actuating lever pivotally connected with said axle at one end and projected upward beyond the rim of said wheel, an actuating pawl spanning the rim of said wheel and pivotally connected at one end thereof to said lever, double points on the other end of said pawl extended outward from said lever and adapted to bind respectively against the rim of said wheel and turn said wheel in the direction desired, means for shifting the position of said pawl in relation with said lever in accordance with the direction said wheel should be turned, and in line with the movement of said actuating lever therefor, with means for separating both of said points from said wheel.

DONALD HENDERSON.